United States Patent
Jagannathan et al.

(10) Patent No.: US 11,399,357 B2
(45) Date of Patent: Jul. 26, 2022

(54) METHOD AND SYSTEM OF CONTEXT-BASED PERSONALIZED NOTIFICATION BATCHING

(71) Applicants: Ranjan Jagannathan, Durham, CA (US); Devang Paliwal, Durham, NC (US); Terrel Ashwin Lewis, Durham, NC (US)

(72) Inventors: Ranjan Jagannathan, Durham, CA (US); Devang Paliwal, Durham, NC (US); Terrel Ashwin Lewis, Durham, NC (US)

( * ) Notice: Subject to any disclaimer, the term of this patent is extended or adjusted under 35 U.S.C. 154(b) by 185 days.

(21) Appl. No.: 16/261,540

(22) Filed: Jan. 29, 2019

(65) Prior Publication Data

US 2020/0008171 A1  Jan. 2, 2020

Related U.S. Application Data

(60) Provisional application No. 62/798,451, filed on Jan. 29, 2019, provisional application No. 62/623,365, filed on Jan. 29, 2018.

(51) Int. Cl.

| | |
|---|---|
| *H04W 68/02* | (2009.01) |
| *H04W 68/00* | (2009.01) |
| *H04W 4/12* | (2009.01) |
| *H04L 51/02* | (2022.01) |
| *H04L 51/226* | (2022.01) |
| *H04L 51/42* | (2022.01) |
| *H04L 67/50* | (2022.01) |

(52) U.S. Cl.
CPC ............. *H04W 68/02* (2013.01); *H04L 51/02* (2013.01); *H04L 51/22* (2013.01); *H04L 51/26* (2013.01); *H04L 67/22* (2013.01); *H04W 4/12* (2013.01); *H04W 68/005* (2013.01)

(58) Field of Classification Search
CPC .... H04W 68/02; H04W 68/005; H04L 51/02; H04L 51/22; H04L 51/26; H04L 67/22; H04L 4/12
USPC ....................................................... 455/458
See application file for complete search history.

(56) References Cited

U.S. PATENT DOCUMENTS

| | | | |
|---|---|---|---|
| 10,223,156 B2* | 3/2019 | Chan ..................... | G06F 1/3206 |
| 2012/0023226 A1* | 1/2012 | Petersen ................. | H04W 4/18 |
| | | | 709/224 |
| 2012/0110173 A1* | 5/2012 | Luna ...................... | H04L 67/145 |
| | | | 709/224 |
| 2012/0331087 A1* | 12/2012 | Luna .................... | H04L 67/2842 |
| | | | 709/224 |
| 2013/0303106 A1* | 11/2013 | Martin .................... | H04W 4/12 |
| | | | 455/404.2 |

(Continued)

*Primary Examiner* — Nathan S Taylor

(57) ABSTRACT

In one aspect, a computerized method for implementing contextual-based batching of incoming notifications comprising includes the step of receiving an incoming notification. The method includes the step of determining a user context at a time of the incoming notification is received. The method includes the step of determining a time sensitivity of the incoming notification at a time the incoming notification is received. The time sensitivity of the incoming notification indicates that the incoming notification is not time sensitive. Based on the user context and the time sensitivity of the incoming notification, the method batches the incoming notification and delivers the notification to a notification inbox on a specified schedule.

7 Claims, 13 Drawing Sheets

(56) References Cited

U.S. PATENT DOCUMENTS

| | | | |
|---|---|---|---|
| 2014/0082093 A1* | 3/2014 | Savage | H04L 41/50 709/206 |
| 2014/0082115 A1* | 3/2014 | Lau | G06F 9/4893 709/207 |
| 2014/0122624 A1* | 5/2014 | Nerieri | H04L 67/327 709/206 |
| 2014/0366042 A1* | 12/2014 | Chan | H04L 67/2842 719/318 |
| 2016/0308940 A1* | 10/2016 | Procopio | G06F 3/04842 |
| 2017/0099592 A1* | 4/2017 | Loeb | H04L 67/303 |
| 2017/0118159 A1* | 4/2017 | Ratiu | H04L 51/26 |
| 2018/0077097 A1* | 3/2018 | Alfaro | H04L 51/12 |
| 2018/0165708 A1* | 6/2018 | Bajaj | G06Q 30/0251 |

\* cited by examiner

| |
|---|
| FB messenger ** |
| Whatsapp ** |
| Messages |
| Textra SMS |
| Kakao messaging |
| Slack |
| Samsung Mail (Email client) |
| Telegram messenger |
| Google Calendar |
| Skype ** |
| Samsung messaging client |
| Pulse SMS |
| Kik messaging app |
| HTC SMS client |
| Republic Anywhere (Messaging client) |
| SMS client |
| Viber |
| Google maps |
| Uber |
| System launcher(Battery status) |
| Paypal |

1200

METHOD AND SYSTEM OF CONTEXT-BASED PERSONALIZED NOTIFICATION BATCHING

CROSS-REFERENCE TO RELATED APPLICATIONS

This application is a claims priority from U.S. Provisional Patent Application No. 62/623,365, filed on 29 Jan. 2018 and titled METHOD AND SYSTEM OF CONTEXT-BASED PERSONALIZED NOTIFICATION BATCHING. This application is hereby incorporated by reference in its entirety.

This application is a claims priority from U.S. Provisional Patent Application No. 62/798,451, filed on 29 Jan. 2019 and titled METHOD AND SYSTEM OF CONTEXT-BASED PERSONALIZED NOTIFICATION BATCHING. This application is hereby incorporated by reference in its entirety.

FIELD OF THE INVENTION

The invention is in the field of mobile devices search and more specifically to a method, system and apparatus of context-based personalized notification batching.

DESCRIPTION OF THE RELATED ART

Mobile devices have led to the extreme popularity of asynchronous electronic messaging (e.g. text messages, chat messages, push notifications, etc.) between users and applications. Popularity has grown to such an extent that texting and other forms of messaging are now one of the most frequent forms of communication. Mobile device applications often include messaging/notification functionalities. Employers, educational institutions, governments, etc. often communicate to users via some form of text/multi-media messaging to a user's mobile device. In this way, users are now bombarded by multiple origins/sources of asynchronous electronic messages regardless of the user's context. As a result, users are often stressed and overwhelmed with incoming messages. Accordingly, improvements to filtering incoming notifications to user's mobile devices are desired.

BRIEF SUMMARY OF THE INVENTION

In one aspect, a computerized method for implementing contextual-based batching of incoming notifications comprising includes the step of receiving an incoming notification. The method includes the step of determining a user context at a time of the incoming notification is received. The method includes the step of determining a time sensitivity of the incoming notification at a time the incoming notification is received. The time sensitivity of the incoming notification indicates that the incoming notification is not time sensitive. Based on the user context and the time sensitivity of the incoming notification, the method batches the incoming notification and delivers the notification to a notification inbox on a specified schedule.

In another aspect, a computerized method for implementing contextual auto-responses to incoming notifications includes the step of receiving an incoming notification. The method includes the step of determining a user context at a time of the incoming notification is received; determining a time sensitivity of the incoming notification at a time of the incoming notification is received. The time sensitivity of the incoming notification indicates that the incoming notification is not time sensitive. Based on the user context and the time sensitivity of the incoming notification, the method batches the incoming notification. Based on the user context, the method generates an auto-response to a sender of the incoming notification. The auto-response comprises information about the user context; and communicating the auto-response to the sender.

In yet another aspect, a computerized method for context-based notification batching includes the step of receiving a first notification. The method includes the step of receiving a second notification. The method includes the step of determining a time sensitivity of the first notification at a time of the first notification is received. The time sensitivity of the first notification indicates that the first notification is not time sensitive. Based on a non-time sensitivity of the first notification, the method batches the first notification. The method includes the step of generating and communicating an auto-response to a sender of the first notification indicating the first notification is scheduled to be communicated to the user at a later time. The method includes the step of determining a time sensitivity of the second notification at a time of the second notification is received. The time sensitivity of the second notification indicates that the second notification is time sensitive. The method includes the step of immediately delivering the second notification to a notification inbox of the user. The method includes the step of delivering the notification to a notification inbox on a specified schedule.

Figure 1:
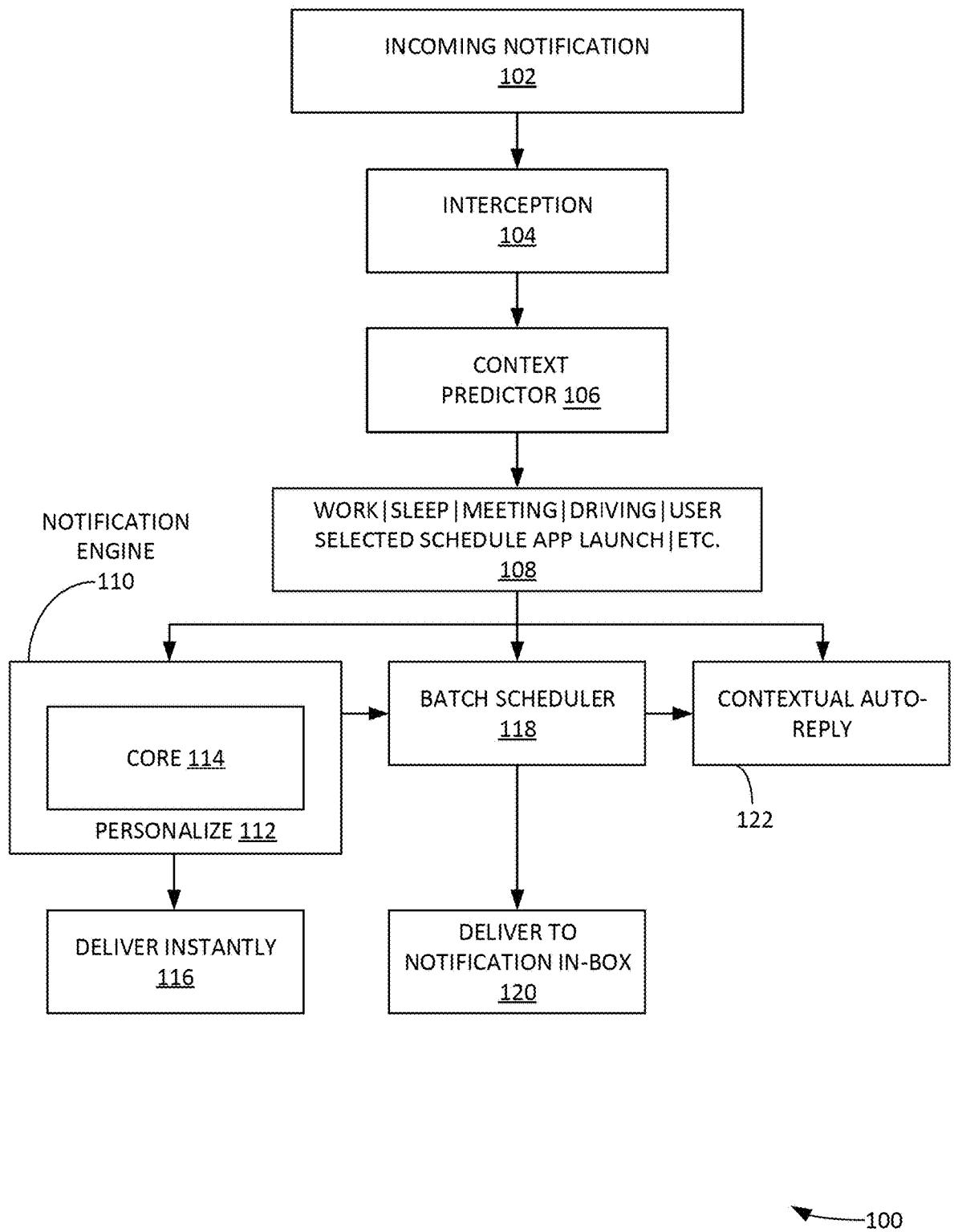
FIG. 1 illustrates an example process for context-based personalized notification batching, according to some embodiments.

The Figures described above are a representative set, and are not an exhaustive with respect to embodying the invention.

DESCRIPTION

Disclosed are a system, method, and article of manufacture for context-based personalized notification batching.

The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' in 'an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Intent mining can be the process of determining a user's intention from logs of their behavior and personalized feedback in interaction with a computer system.

Notification system can be a combination of software and hardware that provides a means of delivering a message to a set of recipients.

Notifications can be electronic messages delivered to a user's mobile device. Example notifications include, inter alia: push notifications, text messages (e.g. SMS, MMS, etc.), instant messages, mobile alerts, offers, news, social media interactions, calendar updates, banking transaction updates, traffic and weather updates, entertainment updates, email updates, etc. Notifications can be messages to a user that pop-up on the user's mobile device interface and/or cause a notification alert (e.g. pop-up message, sound alert, etc.). Notifications can be used by applications to communicate with mobile-device users.

Push notification can be a message that pops-up on a mobile device. In one example, application publishers can communicate a push notification (e.g. at any time). The mobile may not be in the application to or a user using said mobile device to receive a push notification.

Sentiment analysis refers to the use of natural language processing, text analysis, computational linguistics, and biometrics to systematically identify, extract, quantify, and study affective states and subjective information.

Text analysis is the process of deriving high-quality information from text. High-quality information is typically derived through the devising of patterns and trends through means such as statistical pattern learning. Text mining usually involves the process of structuring the input text (usually parsing, along with the addition of some derived linguistic features and the removal of others, and subsequent insertion into a database), deriving patterns within the structured data, and finally evaluation and interpretation of the output.

Example Methods

A context-based personalized notification batching system is provided. The context-based personalized notification batching system can batch notifications. By batching notifications, the context-based personalized notification batching system can deliver (e.g. render on the mobile-device's interface with a pop up, etc.) notifications at specific and predictable intervals to the user. Context-based personalized notification batching system can deliver notifications in a specified cadence. Context-based personalized notification batching system can deliver notifications in batches in different user contexts. Example user contexts can include, inter alia: working, sleeping, driving, in a meeting, etc. Context-based personalized notification batching system can automatically determine a user context. Context-based personalized batching system can determine what kind of notifications should be delivered in time specific batches and what kinds should be delivered instantly. Context-based personalized batching system constantly learns and updates the rules for batching based on user feedback and interaction with notifications.

FIG. 1 illustrates an example process 100 for context-based personalized notification batching, according to some embodiments. In step 102, an incoming notification is received. In step 104, the notification is intercepted. In step 106, a context predictor is implemented. In one example, the context predictor system can provide a confidence score for a set of user contexts. The context predictor can rank these and output a most likely user context.

In step 108, a user's context is determined based on the output of step 106. In step 110, a notification engine can be implemented.

Notification engine 110 can include core layer 114 and personalization layer 112. Based on the user context and rules (e.g. core rules and/or personalized rules), the notification engine can determine whether to batch the notification or deliver the notification instantly. Notification engine 110 can deliver the notification instantly 116 (e.g. assuming networking and processing latencies, etc.) or send the notification to a batch scheduler 118. Batch scheduler 118 can deliver the notification to notification inbox 120. Batch scheduler 118 can batch schedule based on various factors. Example factors that can be considered can include: size of batch, frequency of notifications, frequency of batch deliveries, user selected schedule application launch, etc. An inbox for notifications can be provided. Batches of notifications can be sent to the inbox for later viewing by the user. The user can receive a notice that there are notifications in the inbox at specified times/intervals.

Time and context sensitive batching can be implementing as well. For example, context-based personalized notification batching system can batch notifications for an hour after the user wakes up. Context-based personalized notification batching system can batch notifications when the user is watching a movie. Context-based personalized notification batching system can implement a personalized notification delivery system. A user can define a combination of when, from whom and what kind of notifications the user wants to receive. For example, the user can specify to "send me notifications from Ranjan only after 3 pm, except when it is time sensitive". In another example, the user can specify "Do not send me summary notification when five people reach out to me on WHATSAPP". Context-based personalized notification batching system can batch notifications based on application and website usage. Context-based personalized notification batching system can batch notifications when certain applications are in use. For example, a user is using COURSERA, all notifications except the time sensitive notifications are batched till the entire duration of the application usage. This can be extended to a web session as well. When a user is on COURSERA.COM and has a web browser extension version of context-based personalized notification batching system application, then the context-based personalized notification batching system can batch notifications on the user's phone. Context-based personalized notification batching system can provide a batching SDK for applications. This batching module with default rules can be wrapped into an SDK for other applications to integrate. Context-based notification batching also uses natural language processing techniques to rate the emotion or sentiment of a notification text to decide if it is to be shown immediately or later. For example, a news article notification which could cause emotions of outrage or anger may not be sent at night during bedtime of the user, but later next day unless it was an emergency.

Figure 2:
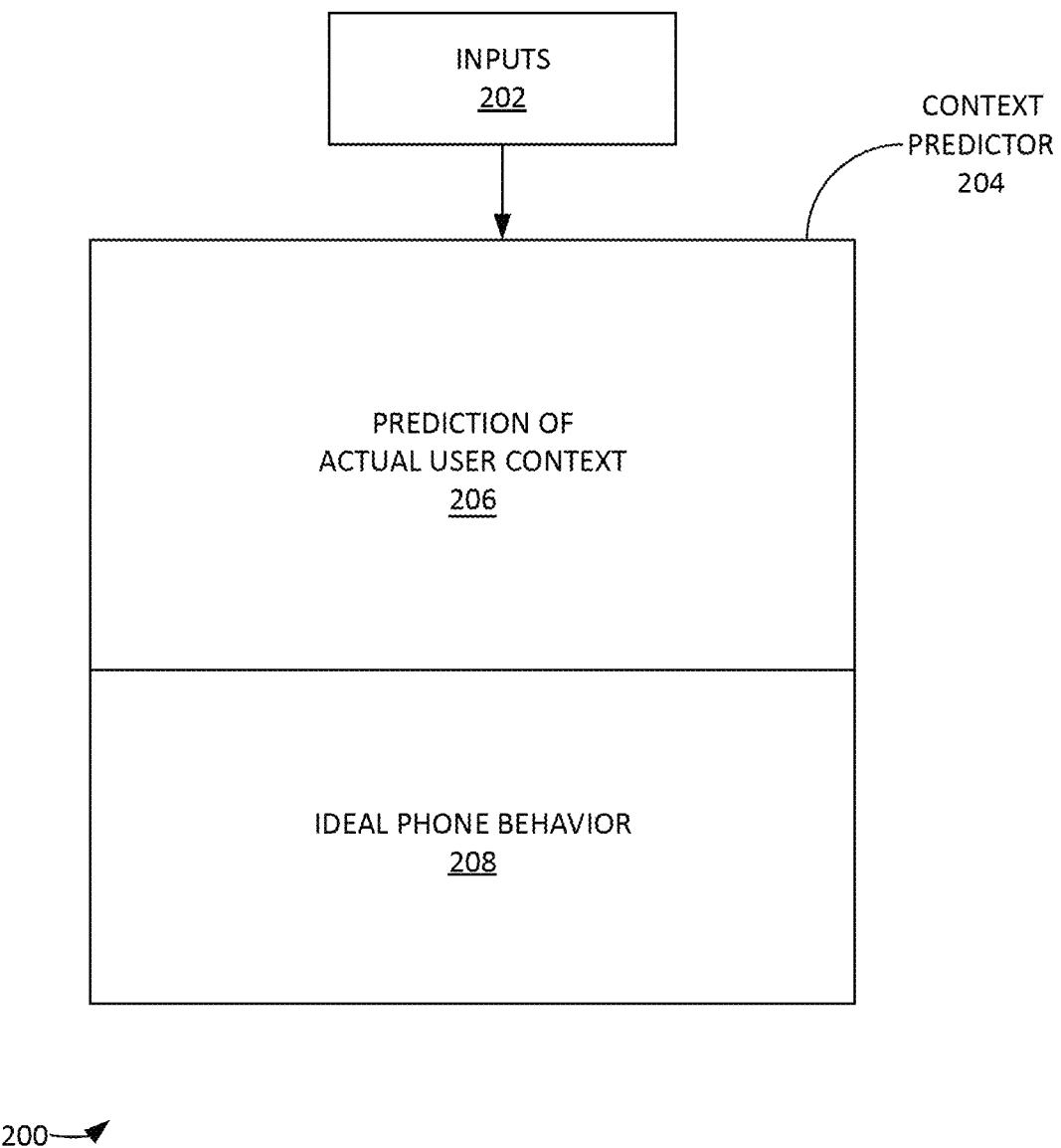
FIG. 2 illustrates an example context predictor, according to some embodiments.

FIG. 2 illustrates an example context predictor 200, according to some embodiments. Context predictor 204 can receive/obtain various inputs 202. Inputs 202 can include various signals such as, inter alia: clock data, GPS data, motion sensor data, position sensor data, local wireless network data, bandwidth data, user input, environmental sensors, user-browser activity, local weather/traffic data, user-activity recognition system data, calendar data, etc. Inputs 202 can be used to generate the user context/activity prediction score. For example, at a specified time of day on a specified type of day (e.g. work day, weekend, etc.) and the user at the office, then there is a ninety percent likelihood that the user is working. In step 206, context predictor 204 can implement prediction of actual user context. In step 208, context predictor 204 can determine ideal mobile device/cellular phone behavior. This can be a user context/activity that the user would like to be ideally behaving at the specified time in a specified context (e.g. working with focus and no interruption, driving without interruption, in a meeting, sleeping, etc.). For example, if the user is in a meeting then the ideal mobile device/cellular phone behavior would be to not be using the user's mobile device. User input can be used to verify ideal mobile device/cellular phone behavior.

Figure 3:
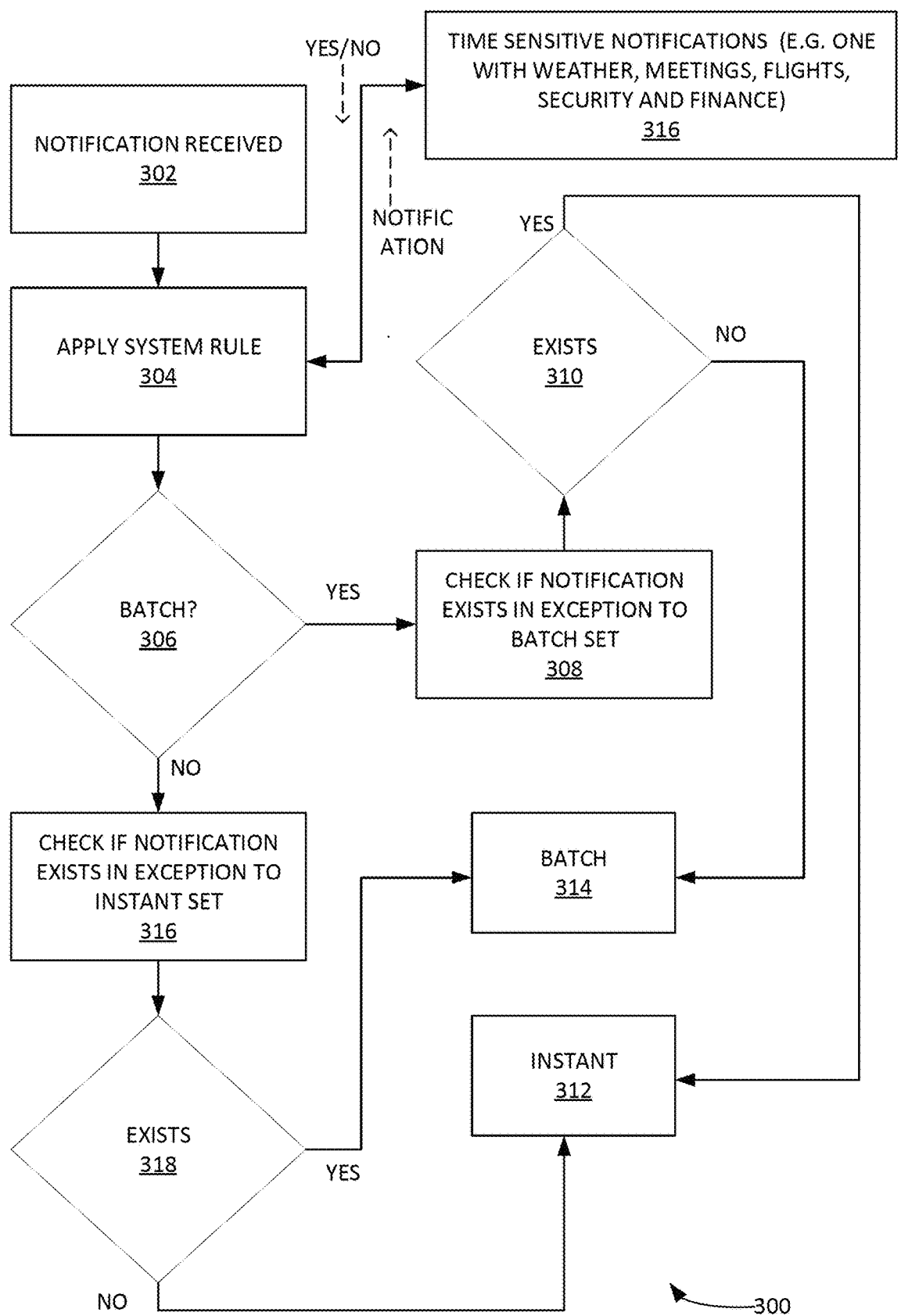
FIG. 3 illustrates an example process of a core/personalize batching rule engine, according to some embodiments.

FIG. 3 illustrates an example process 300 of a core/personalize batching rule engine, according to some embodiments. Process 300 can be used to determine if a notification should be batched or sent instantly based on a set of core and personalized rules. In step 302, process 300 can receive a notification. In step 304, process 300 can apply system rule(s). Additionally, in step 312, process 300 can determine if the notification is time sensitive. For example, step 312 can implement parts of speech extraction. In step 306, based on output of steps 304 and/or 312, process 300 can determine whether or not to batch the notification. If step 306 determines 'yes', then process 300 can proceed to step 308. In step 308, process 300 can check if notification exists in the exception to batch set. In step 310, if a notification exists in the exception to batch set, then process 300 can allow the notification to be presented with the user's mobile device in step 312. In step 310, if a notification does not exist in the exception to batch set, then process 300 can batch the notification in step 314.

If step 306 determines 'no', then process 300 can proceed to step 316. In step 316, process 300 can check if notification exists in the exception to instant set (e.g. a set of instant notifications, etc.). In step 318, if a notification does not exist in the exception to instant set, then process 300 can allow the notification to be presented with the user's mobile device in step 312. In step 318, if a notification does exist in the exception to instant set, then process 300 can batch the notification in step 314. It is noted that batching can be implemented across platforms (e.g. web push notifications, mobile web push notifications, voice notifications, smartwatches, etc.).

Figure 4:
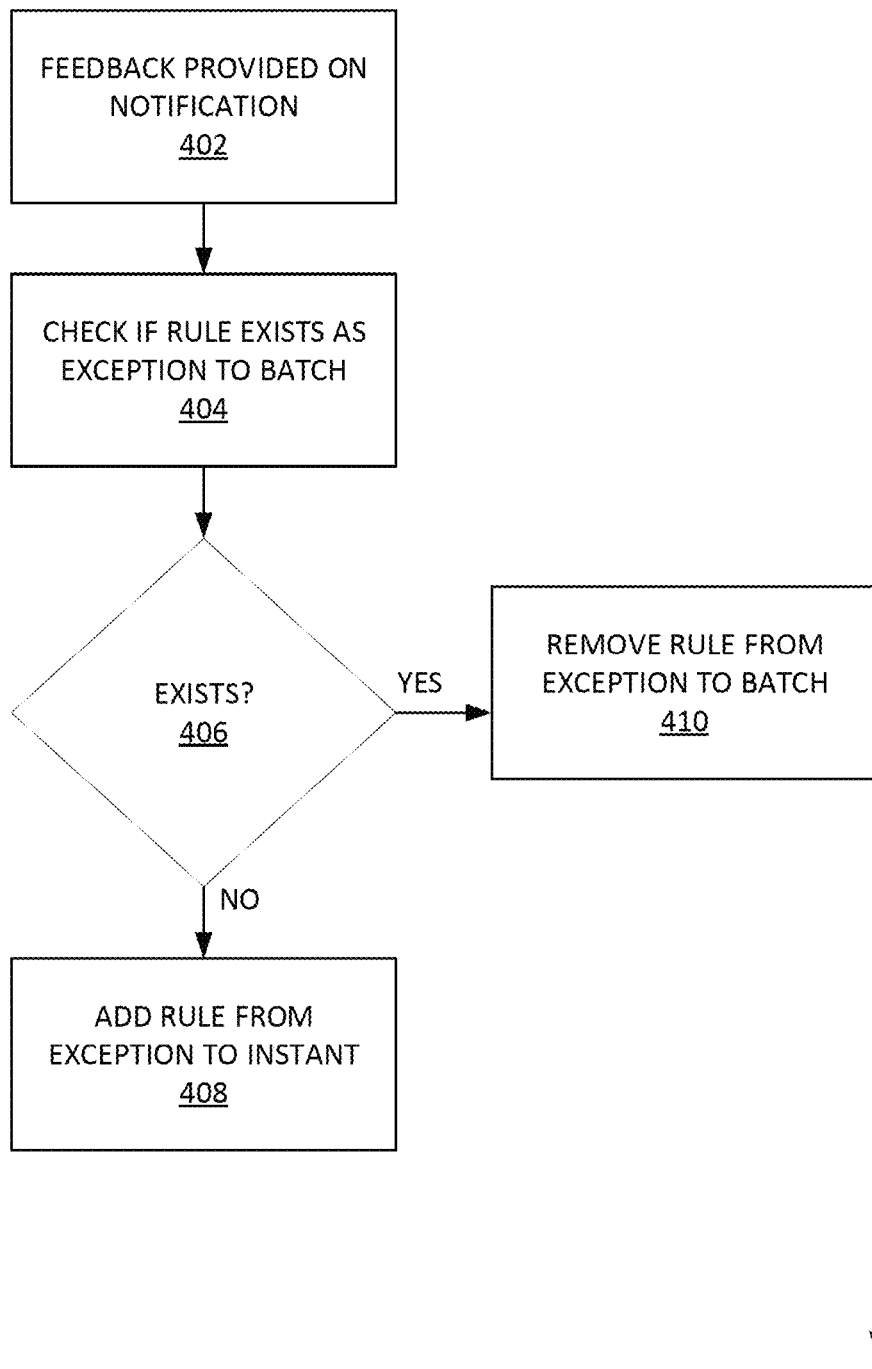
FIG. 4 illustrates an example process for updating batching rules based on user feedback, according to some embodiments.

FIG. 4 illustrates an example process 400 for updating batching rules based on user feedback, according to some embodiments. In step 402, a user provides feedback on a notification. In step 404, process 400 can check if rule exists as exception to batch. In step 406, if the rule exists then process 400 can proceed to step 410. In step 410, process 400 can remove the rule from the exception to batch list. In step 406, if the rule does not exist then process 400 can proceed to step 408. In step 408, process 400 can add the rule from the exception to instant.

Figure 5:
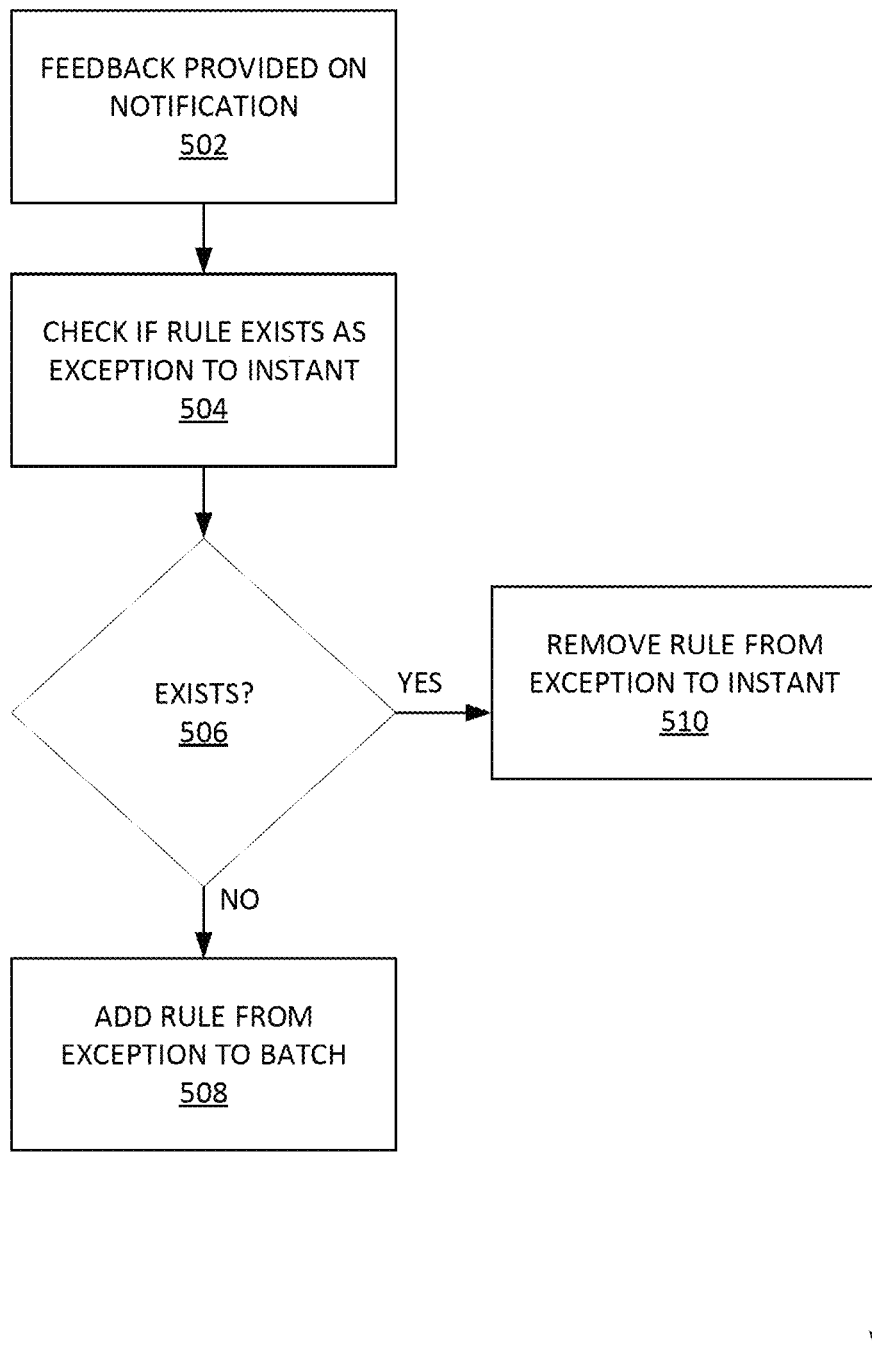
FIG. 5 illustrates an example process for updating rules based on user feedback, according to some embodiments.

FIG. 5 illustrates an example process 500 for updating rules based on user feedback, according to some embodiments. In step 502, a user can provide feedback on notification. In step 504, process 500 can check if rule exists as exception to the instant. In step 506, if the rule exists, then in step 510, process 500 can remove rule from exception to instant. In step 506, if the rule exists, then in step 508, process 500 can add the rule from exception to batch.

Figure 6:
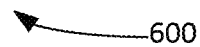
FIG. 6 illustrates an example process for table for core or global notifications rules, according to some embodiments.

FIG. 6 illustrates an example table 600 for core or global notifications rules, according to some embodiments. It is noted that user can determine specific types of notifications and/or applications that are time sensitive. Time sensitive notifications can be provided instantly. Context-based personalized notification batching system can parse between group messages and/or direct messages. In this way, group messages can be batched but direct messages with important content can be instantly provided, in one example.

In one example, all notifications which are not instant chat applications or time sensitive alerts are batched. Time sensitive notifications can include, inter alia: calendar, direct messages, ride arrival notifications, weather alerts, breaking news, security alerts, bank alerts, password reset, one-time password, missed calls, etc. Candidate notifications for batching can include, inter alia: emails, group messages, message forwards, shopping, offers, news, rest alerts, etc. The ** indicates that specific rules have been devised for these applications to selectively batch specified types of notifications such as, for example, group messages.

It is noted that an auto-reply within the application option can be provided. An auto-reply can be generated and returned within the applications. For example, if another user sends the user a SLACK message, an auto-reply inside the SLACK can be generated and communicated back to the other user's SLACK application. In one example, an automated assistant can be utilized to generate auto-replies in a natural language and intelligent manner. The automated assistant can be a proxy for the user in some examples and perform various task such as update the user's calendar, make reservations at a restaurant, schedule a meeting, let the sender know the user is in a meeting, etc. It is noted that contextual auto-reply can be implemented. For example, a set of contextual auto-reply can be as follows: "Mike is reading this article now, and will be checking your messages in a bit"; X is asleep now and will see your message when they wake up. Driving, watching Netflix.

Sentiment analysis on notification content and batching on context can also be implemented by the context-based personalized notification batching system. For example, violent or rage-based notifications won't be shown at night before the user's sleep time to avoid emotional hijacking of the user. In this way, the context-based personalized notification batching system can be used to preserve a user's current and/or ideal energy, mood and emotions at specified periods. Notifications can be grouped into bulletins like sports, offers, weather, social media etc.

Figure 7:
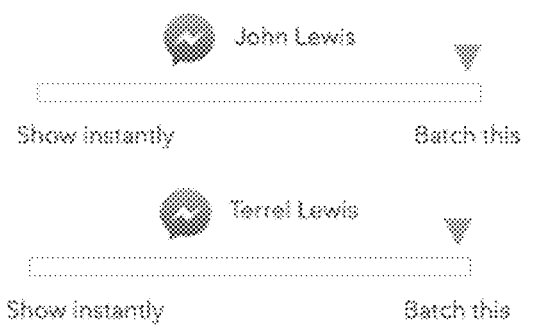
FIG. 7 illustrates an example screenshot for enabling user feedback, according to some embodiments.

FIG. 7 illustrates an example screenshot 700 for enabling user feedback, according to some embodiments. user can provide personalization feedback on batched and/or instantly delivered notifications. This feedback can be included in the personalization layer of the notification engine. This can be specific to direct messages. Feedback can be at the combination of contact and/or at application level. Accordingly, the user can personalize which contact and/or application combination should be batched (e.g. in a 'superbatch', etc.) or be instantly notified.

Figure 8:
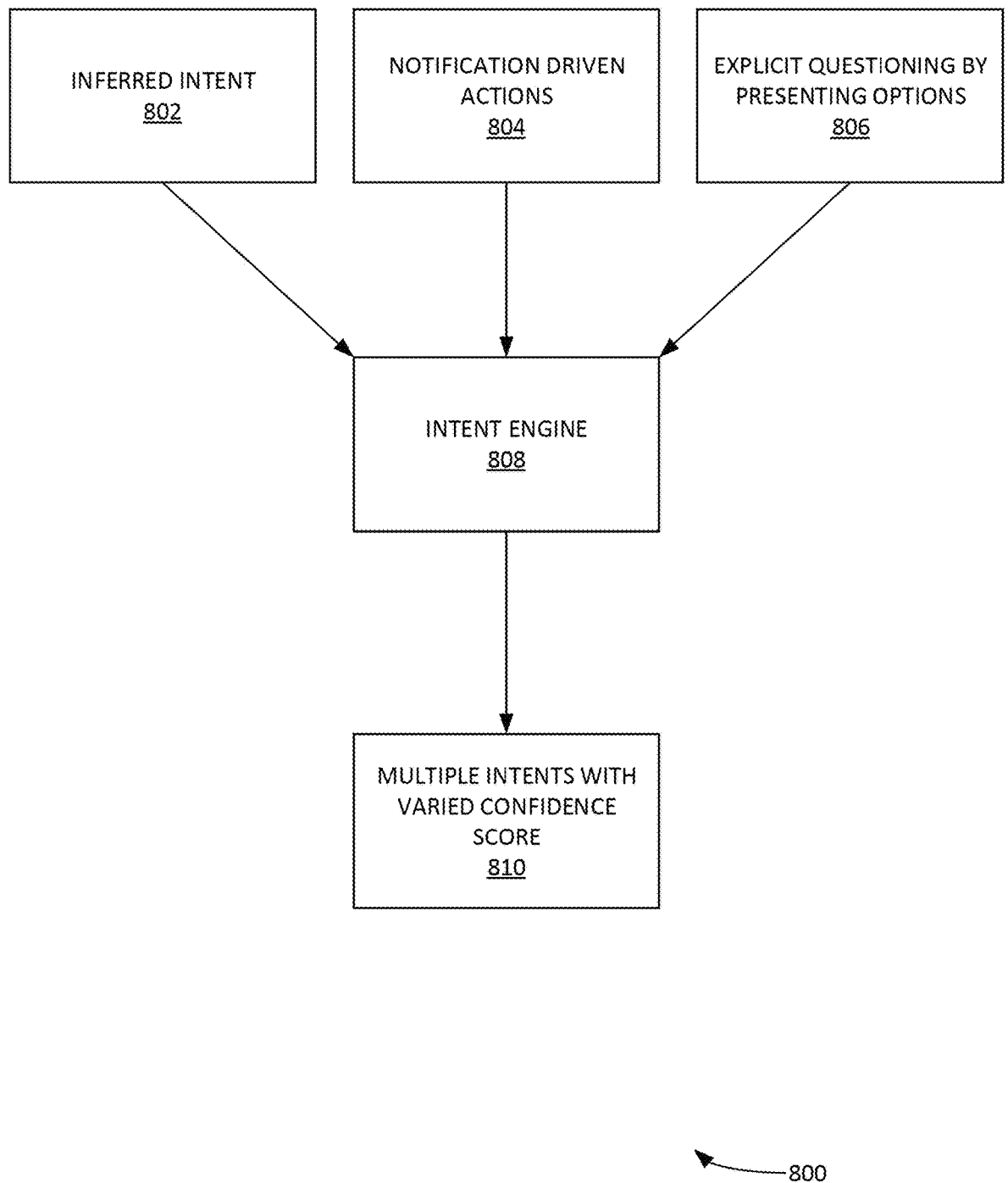
FIG. 8 illustrates an example process for implementing an intent engine, according to some embodiments.

FIG. 8 illustrates an example process 800 for implementing an intent engine, according to some embodiments. Intent engine can implement intent mining and publishing from open application. Intent engine can determine an intent behind why a user is using an application in a specific context. For example, when a user is at work on a Monday and is using FACEBOOK, an intent can be determined why she is doing so (e.g. boredom, procrastination, taking a break, force of habit, checking notifications, looking for information etc.). Intent engine can determine the user's context and past behavior as input to best predict the current intent behind why a user is opening an application.

Process 800 can obtain a user's inferred intent 802, various user notification driven actions 804, and/or explicit questioning user by presenting options 806. This information can be provided to intent engine 808. Intent engine 808 can use this information to generate multiple intents with varied confidence scores (e.g. using confidence weighting, ranking algorithms, scoring algorithms, etc.).

Process 800 (and/or other processes provided herein) can use machine learning to optimize scoring/ranking operations. Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Figure 9:
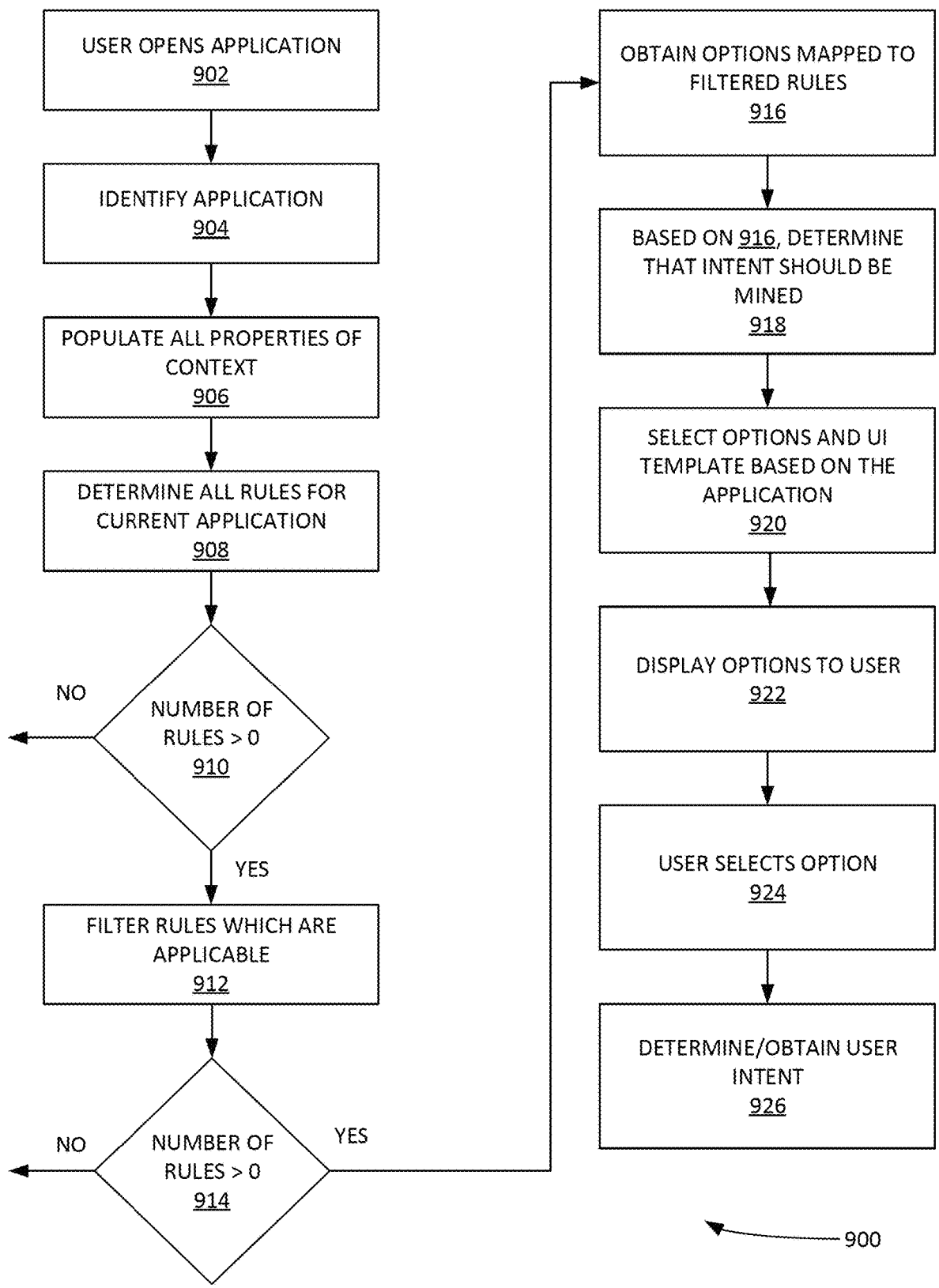
FIG. 9 illustrates an example process for user intent mining, according to some embodiments.

FIG. 9 illustrates an example process 900 for user intent mining, according to some embodiments. In step 902, process 900 detects that a user opens application. In step 904, process 900 identifies the application. In step 906, process 900 populates all properties of context. In step 908, process 900 determines all rules for current application. In step 910, process 900 determines if the number of rules are greater than zero. If there no rules, then the intent won't be mined at that time and there is no prompt shown to the nothing is shown to the user. If yes, process 900 determines which filter rules which are applicable in step 912. In step 914, determines if the number of rules are greater than. In step 916, process 900 obtains options mapped to filtered rules. In step 918, based on 916, process 900 determines that intent should be mined. In step 920, process 900 selects options and user interface (UI) templates based on the application. In step 922, process 900 displays options to user. In step 924, process 900 enables a user to select an option. In step 926, process 900 determines/provides user intent.

Figure 10:
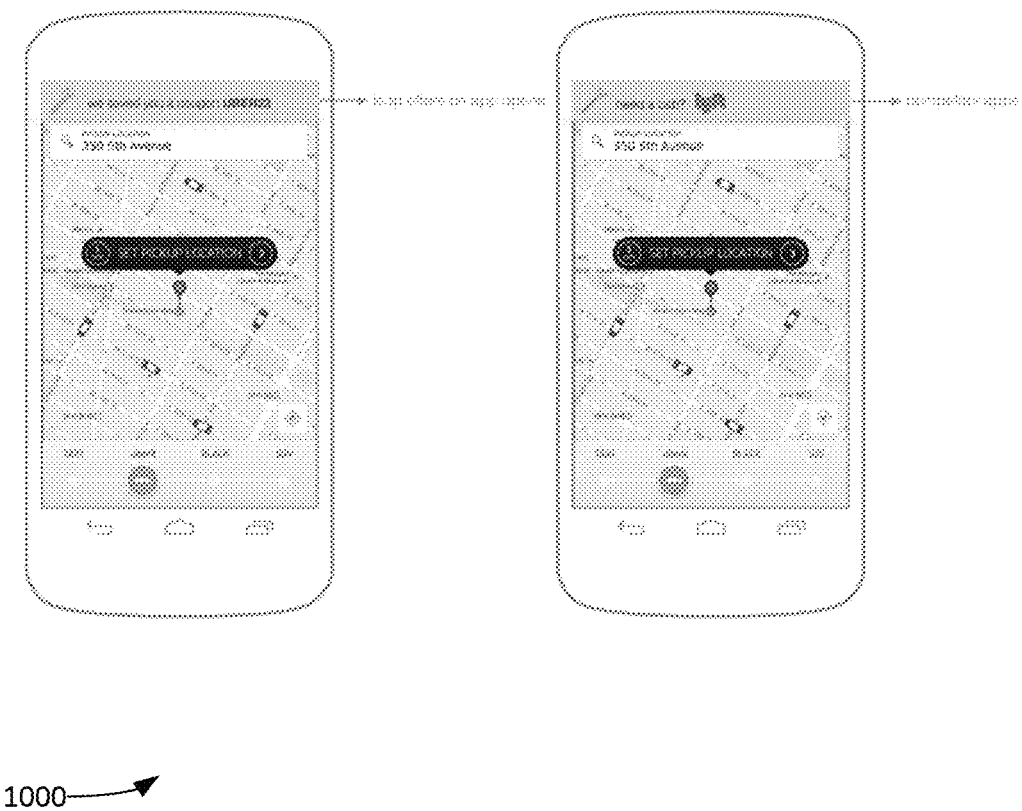
FIG. 10 illustrates an example screenshot of targeting the user with relevant notifications based on the context and intent, according to some embodiments.

FIG. 10 illustrates an example screenshot 1000 of targeting the user with relevant notifications based on the context and intent, according to some embodiments. As shown, this intent can be used to target the user with relevant notifications based on the context and intent. For example, the user is opening the UBER application. The user's intent can be 'booking a ride'. Accordingly, the LYFT application can consume this intent and create a notification dynamically or context-based personalized notification batching system can resurface a past notification (e.g. Try UBER or an Offer). Competitive notifications can be implemented, and applications can send notifications at the point of decision making. Context-based personalized notification batching system can implement this even if the LYFT application isn't present on a user's phone. LYFT can still target this notification via the context-based personalized notification batching system. For example, Context-based personalized notification batching system can provide an API to LYFT's servers to capture the information and provide the competing offers. Accordingly, upon opening the notification, the user may be prompted to download LYFT.

Currently applications and notifications operate in silos. When a user books a movie ticket from an application, the user receives a notification with a confirmation. When the user books a cab, the user can receive a notification from that application. The user can receive an offer notification from another application to shop with it. These happen independently. But for a user these could be combined as 'planning an evening'.

Context-based personalized notification batching system can extract user intent from batched notifications and application opens. For example, context-based personalized notification batching system can understand the user's future location and activity, based on select notifications like calendar or eCommerce. Context-based personalized notification batching system can create a recommended notification at the point of decision making for the user.

Figure 11:
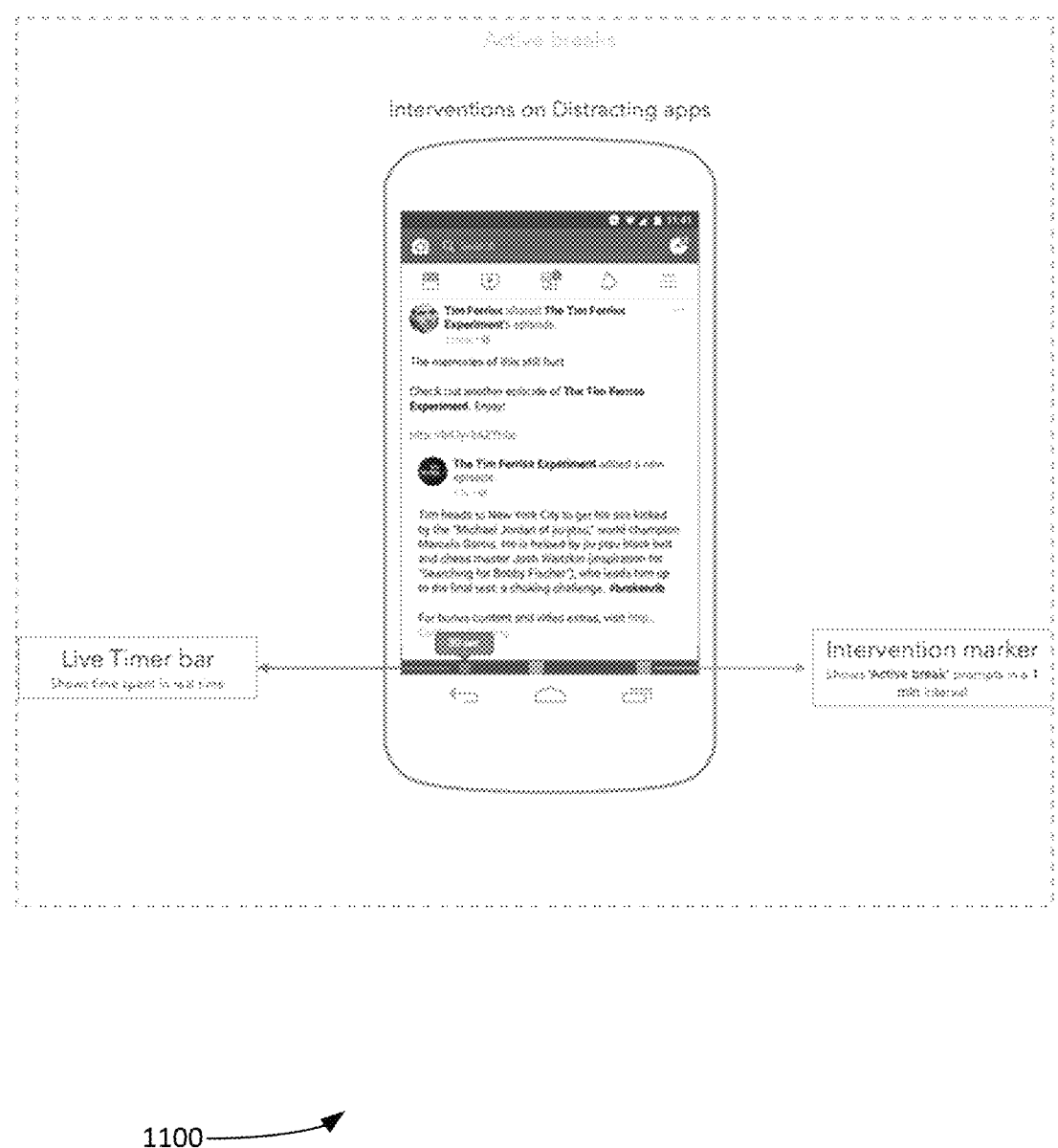
FIGS. 11-12 illustrates an example screenshots of implementing a behavior intervention platform, according to some embodiments.
Figure 12:
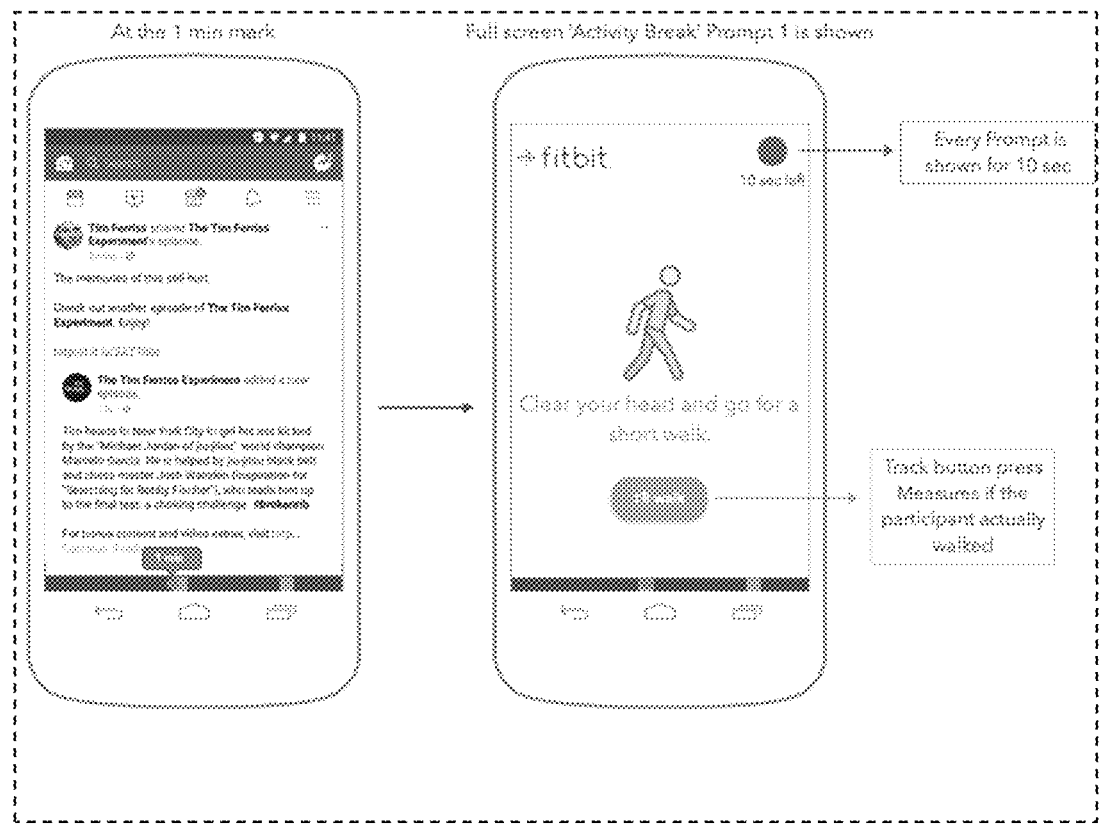

FIGS. 11-12 illustrates an example screenshots 1100-1200 of implementing a behavior intervention platform, according to some embodiments. Applications can insert their experiences in other applications, as long as they address or map back to the same intent. User intent and user context can also be used as input. For example, if a user uses the FACEBOOK application at work to mostly take breaks, this intent can be used by the FITBIT application to insert their experience within FACEBOOK application session, through the context-based personalized notification batching system application.

Context-based personalized notification batching system can determine the content of a notification. Context-based personalized notification batching system can include a functionality for implementing parts of speech extraction. For example, context-based personalized notification batching system can implement grammatical tagging and/or word-category disambiguation that includes marking up a word in the notification text as corresponding to a particular part of speech, based on both its definition and its context. Context-based personalized notification batching system can also search for key words/phrases that indicate that the notification has a high priority and/or time sensitivity (e.g. 'now', 'emergency', 'very important', etc.). Context-based personalized notification batching system can implement various natural-language processing, text analysis and sentiment analysis algorithms as well. Accordingly, the context-based personalized notification batching system the sentimentality of the notification content and determine if it is an appropriate time to send the notification to the user or batch the notification.

Additional Computer Architecture

Figure 13:
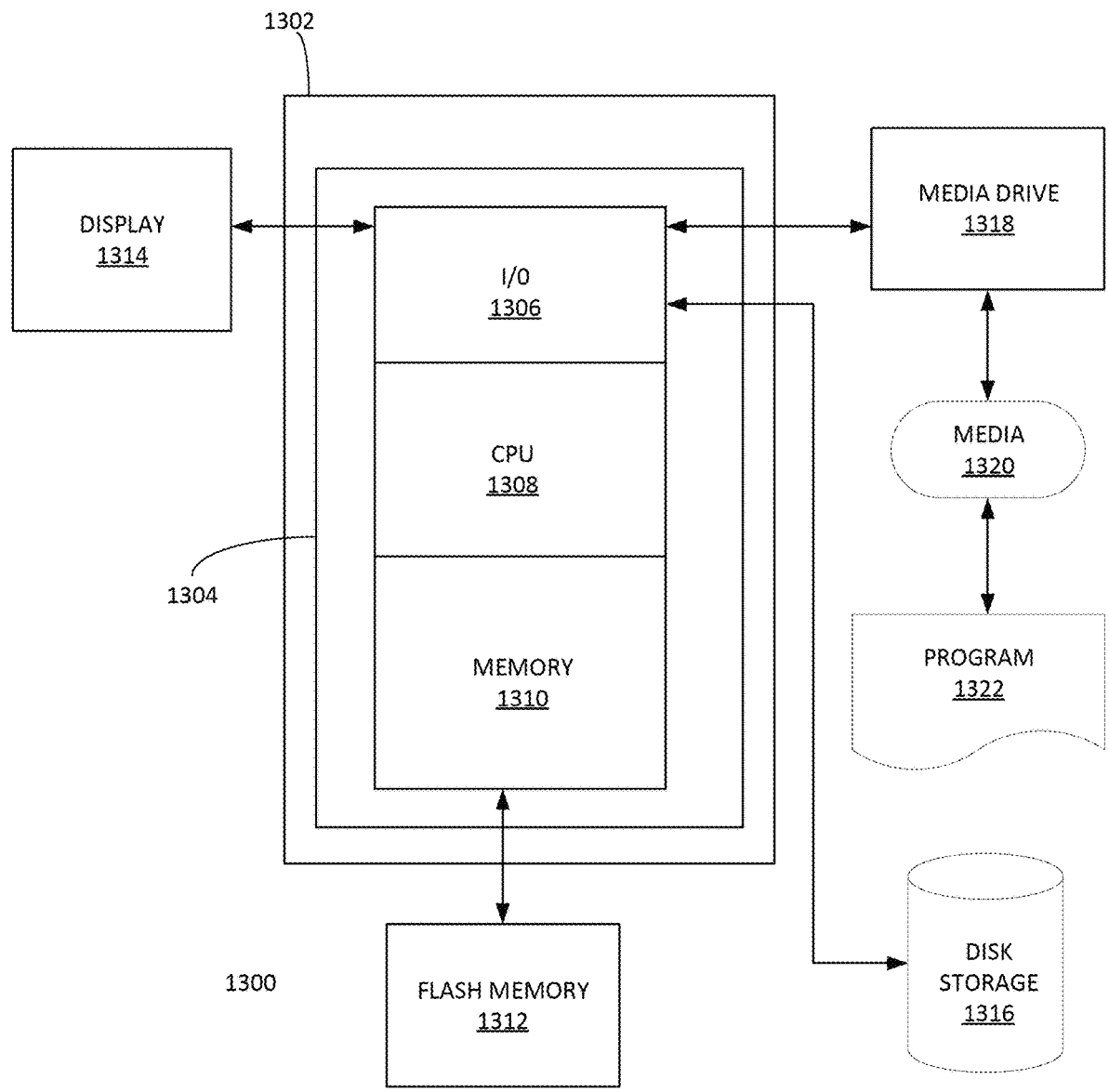
FIG. 13 depicts an exemplary computing system that can be configured to perform any one of the processes provided herein.

FIG. 13 depicts an exemplary computing system 1300 that can be configured to perform any one of the processes provided herein. In this context, computing system 1300 may include, for example, a processor, memory, storage, and I/O devices (e.g., monitor, keyboard, disk drive, Internet connection, etc.). However, computing system 1300 may include circuitry or other specialized hardware for carrying out some or all aspects of the processes. In some operational settings, computing system 1300 may be configured as a system that includes one or more units, each of which is configured to carry out some aspects of the processes either in software, hardware, or some combination thereof.

FIG. 13 depicts computing system 1300 with a number of components that may be used to perform any of the processes described herein. The main system 1302 includes a motherboard 1304 having an I/O section 1306, one or more central processing units (CPU) 1308, and a memory section 1310, which may have a flash memory card 1312 related to it. The I/O section 1306 can be connected to a display 1314, a keyboard and/or other user input (not shown), a disk storage unit 1316, and a media drive unit 1318. The media drive unit 1318 can read/write a computer-readable medium 1320, which can contain programs 1322 and/or data. Computing system 1300 can include a web browser. Moreover, it is noted that computing system 1300 can be configured to include additional systems in order to fulfill various functionalities. Computing system 1300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing contextual-based batching of incoming notifications comprising:
receiving an incoming notification;
determining a user context at a time of the incoming notification is received;
determining a time sensitivity of the incoming notification at the time the incoming notification is received, wherein the time sensitivity of the incoming notification indicates that the incoming notification is not time sensitive;
based on the user context and the time sensitivity of the incoming notification, batching the incoming notification;
based on the user context and a content of the incoming notification generating a competitive message by:
providing an application programming interface (API) to an enterprise,
capturing an application information of an application that has recently been opened by the user and presenting the application information to the API of the enterprise,
receiving a competing offer related to the application information of the recently opened application or the content of the incoming notification, and
communicating the competing offer as the competitive message to the inbox;
wherein a user context is determined by a context predictor, wherein the context predictor provides a confidence score for a set of user contexts and a set of user contexts,
wherein the context predictor ranks a set of user contexts and a set of user contexts and outputs a most likely user context and a most likely user context, and
wherein a user context comprises a user driving state, a user sleeping state, a user working state, a user using an application state, and a user using a meditation application state, and
delivering the incoming notification along with the competing notification to a notification inbox on a specified schedule.

2. The computerized method of claim 1, wherein the incoming notification comprises a text message, a push notification, an instant message, a news alert, a weather alert, an email alert or a chat-application message.

3. The computerized method of claim 1, wherein the specified schedule is the detection of a termination of a current user context.

4. A computerized method for implementing contextual auto-responses to incoming notifications comprising:
receiving an incoming notification;
determining a user context at a time of the incoming notification is received;

determining a time sensitivity of the incoming notification at a time of the incoming notification is received, wherein the time sensitivity of the incoming notification indicates that the incoming notification is not time sensitive;

based on the user context and the time sensitivity of the incoming notification, batching the incoming notification;

based on the user context and a content of the incoming notification generating a competitive message by:
providing an application programming interface (API) to an enterprise,
capturing an application information of an application that has recently been opened by the user and presenting the application information to the API of the enterprise,
receiving a competing offer related to the application information of the recently opened application or the content of the incoming notification, and
communicating the competing offer as the competitive message to the inbox;

based on the user context, generating an auto-response to a sender of the incoming notification, wherein the auto-response comprises information about the user context; and
communicating the auto-response to the sender, and
wherein the auto-response is communicated via a same application that sent the notification to the user,
wherein a user context is determined by a context predictor, and
wherein the context predictor provides a confidence score for a set of user contexts and a set of user contexts where in the context predictor ranks a set of user contexts and a set of user contexts and outputs a most likely user context and a most likely user context.

5. The computerized method of claim 4, wherein the incoming notification comprises a text message, an in-application push notification, an instant message or a chat-application message.

6. A computerized method for context-based notification batching comprising:
receiving a first notification;
receiving a second notification;
determining a time sensitivity of the first notification at a time of the first notification is received, wherein the time sensitivity of the first notification indicates that the first notification is not time sensitive;
based on a non-time sensitivity of the first notification, batching the first notification;
based on the user context and a content of the incoming notification generating a competitive message by:
providing an application programming interface (API) to an enterprise,
capturing an application information of an application that has recently been opened by the user and presenting the application information to the API of the enterprise,
receiving a competing offer related to the application information of the recently opened application or the content of the incoming notification, and
communicating the competing offer as the competitive message to the inbox;
generating and communicating an auto-response to a sender of the first notification indicating the first notification is scheduled to be communicated to the user at a later time;
determining a time sensitivity of the second notification at a time of the second notification is received, wherein the time sensitivity of the second notification indicates that the second notification is time sensitive;
immediately making an exception to batching and showing the notification to the user along with a companion notification indicating the exception;
determining a context sensitivity of the notification, wherein the user's context does not match the context sensitivity of the notification;
implementing a notification engine, wherein the notification engine comprises a core layer and a personalization layer comprising a set of personalized rules of the user wherein the user defines the set of personalized rules as a combination of time periods, notification originators and type of notifications the user is to receive during a specified set of user contexts and user contexts; and
delivering the notification to a notification inbox on a specified schedule, and
wherein the notification comprises a text message, an in-application push notification, an instant message or a chat-application message,
wherein a user context is determined by a context predictor,
wherein the context predictor provides a confidence score for a set of user contexts and a set of user contexts where in the context predictor ranks a set of user contexts and a set of user contexts and outputs a most likely user context and a most likely user context.

7. The computerized method of claim 6, wherein the user context comprises a in the user's work location, a user in the user's sleeping location, a user driving a vehicle or a user in a meeting.

* * * * *